(12) United States Patent
Kelleman et al.

(10) Patent No.: US 9,319,862 B2
(45) Date of Patent: Apr. 19, 2016

(54) SUPPLEMENTAL CROSS-TECHNOLOGY DISCOVERY

(71) Applicant: QUALCOMM Incorporated, San Diego, CA (US)

(72) Inventors: James Kelleman, Easton, PA (US); James Sienicki, Lawrenceville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 14/199,884

(22) Filed: Mar. 6, 2014

(65) Prior Publication Data
US 2015/0256992 A1  Sep. 10, 2015

(51) Int. Cl.
| | |
|---|---|
| *H04W 8/00* | (2009.01) |
| *H04W 48/12* | (2009.01) |
| *H04W 84/12* | (2009.01) |
| *H04W 84/04* | (2009.01) |
| *H04W 48/18* | (2009.01) |
| *H04W 88/06* | (2009.01) |

(52) U.S. Cl.
CPC ............ *H04W 8/005* (2013.01); *H04W 48/12* (2013.01); *H04W 48/18* (2013.01); *H04W 84/042* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,613,156 B2* | 11/2009 | Rittle | H04W 8/005 370/331 |
| 2007/0171910 A1* | 7/2007 | Kumar | H04L 63/0428 370/392 |
| 2008/0069063 A1* | 3/2008 | Li | H04W 88/06 370/338 |
| 2008/0279137 A1* | 11/2008 | Pernu | H04W 88/06 370/328 |
| 2009/0285119 A1* | 11/2009 | Horn | H04W 8/005 370/254 |
| 2010/0291872 A1* | 11/2010 | Laroia | H04W 72/12 455/41.2 |
| 2012/0026941 A1 | 2/2012 | Ahmad et al. | |
| 2012/0269250 A1* | 10/2012 | Li | H04L 5/0053 375/227 |
| 2013/0250931 A1 | 9/2013 | Abraham et al. | |

OTHER PUBLICATIONS

International Search Report and Written Opinion—PCT/US2015/018790—ISA/EPO—May 27, 2015.

* cited by examiner

*Primary Examiner* — Brian Roberts
(74) *Attorney, Agent, or Firm* — Arent Fox LLP

(57) ABSTRACT

A method and an apparatus for wireless communication are provided. In one aspect, the apparatus may be a user equipment (UE), base station, or access point. The apparatus broadcasts peer discovery information in a high-level expression data structure that supports multiple discovery technologies from a variety of wireless networks. By using the high-level expression data, the apparatus may use a single, unified discovery application programming interface for signaling the presence of any supplemental cross-technology discovery information as such information became available. In another aspect, the apparatus may be a UE. The apparatus receives the broadcasted high-level expression data in a peer discovery signal and processes the data.

30 Claims, 16 Drawing Sheets

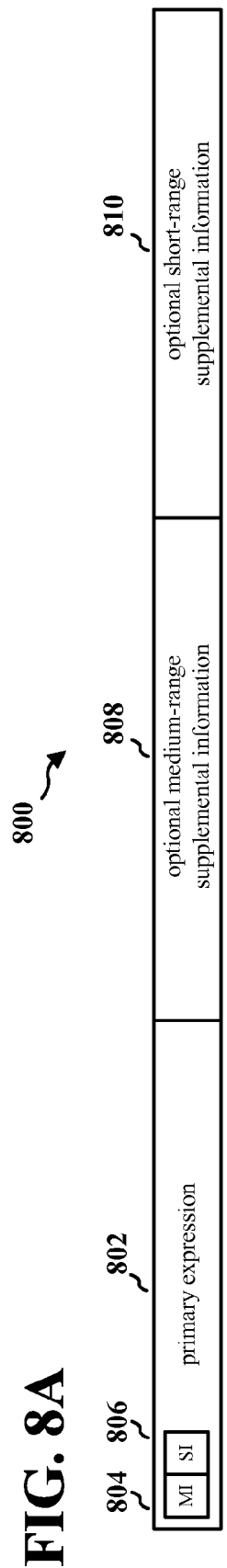
FIG. 8A
FIG. 8B

1000

Primary Expression match. Medium/Short both out-of-range:

| LTE Peer Discovery Expression | (empty) | (empty) |
|---|---|---|
| in range | out of range | |

Primary still matched. Medium range info comes into range and is delivered to application:

| LTE Peer Discovery Expression | WiFi Service Specific-Info 1 | (empty) |
|---|---|---|
| | in range | out of range |

Primary still matched. Second set of medium range info is received and is delivered to application:

| LTE Peer Discovery Expression | WiFi Service Specific-Info 1 | (empty) |
|---|---|---|
| | WiFi Service Specific-Info 2 | |
| | in range | out of range |

Primary and medium still present. Short range info comes into range and is delivered to application:

| LTE Peer Discovery Expression | WiFi Service Specific-Info 1 | BT Advertisement Info 1 |
|---|---|---|
| | WiFi Service Specific-Info 2 | |
| | | in range |

Primary and medium still present. Second set of short range info is received and is delivered to application:

| LTE Peer Discovery Expression | WiFi Service Specific-Info 1 | BT Advertisement Info 1 |
|---|---|---|
| | WiFi Service Specific-Info 2 | BT Advertisement Info 2 |
| | | in range |

Primary and medium still present. Final set of short range info is received and is delivered to application:

| LTE Peer Discovery Expression | WiFi Service Specific-Info 1 | BT Advertisement Info 1 |
|---|---|---|
| | WiFi Service Specific-Info 2 | BT Advertisement Info 2 |
| | | BT Advertisement Info 2 |
| | | in range |

FIG. 10

SUPPLEMENTAL CROSS-TECHNOLOGY DISCOVERY

BACKGROUND

1. Field

The present disclosure relates generally to communication systems, and more particularly, to supplemental cross-technology discovery for peer-to-peer communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE), an access point, or a base station. The apparatus transmits a first set of information in a first peer discovery signal with a first periodicity and a first peer discovery range. The apparatus transmits a second set of information in a second peer discovery signal with a second periodicity and a second peer discovery range, the second periodicity being different from the first periodicity, the second peer discovery range being less than the first peer discovery range, the second set of information being associated with the first set of information.

In another aspect of the disclosure, a method, a computer program product, and an apparatus are provided. The apparatus may be a UE. The apparatus receives a first set of information in a first peer discovery signal with a first periodicity and a first peer discovery range. The apparatus also receives a second set of information in a second peer discovery signal with a second periodicity and a second peer discovery range, the second periodicity being different from the first periodicity, the second peer discovery range being less than the first peer discovery range. The apparatus determines that the second set of information is associated with the first set of information.

BRIEF DESCRIPTION OF THE DRAWINGS

FIG. 8A is a diagram for illustrating an exemplary structure for a high-level expression data for a single, unified discovery API used in peer-to-peer communications.

FIG. 8B is a diagram for illustrating an exemplary data structure for use in peer-to-peer communication systems.

FIG. 10 is a diagram that illustrates how the high-level expression data is presented to an application on a UE.

DETAILED DESCRIPTION

Figure 1:
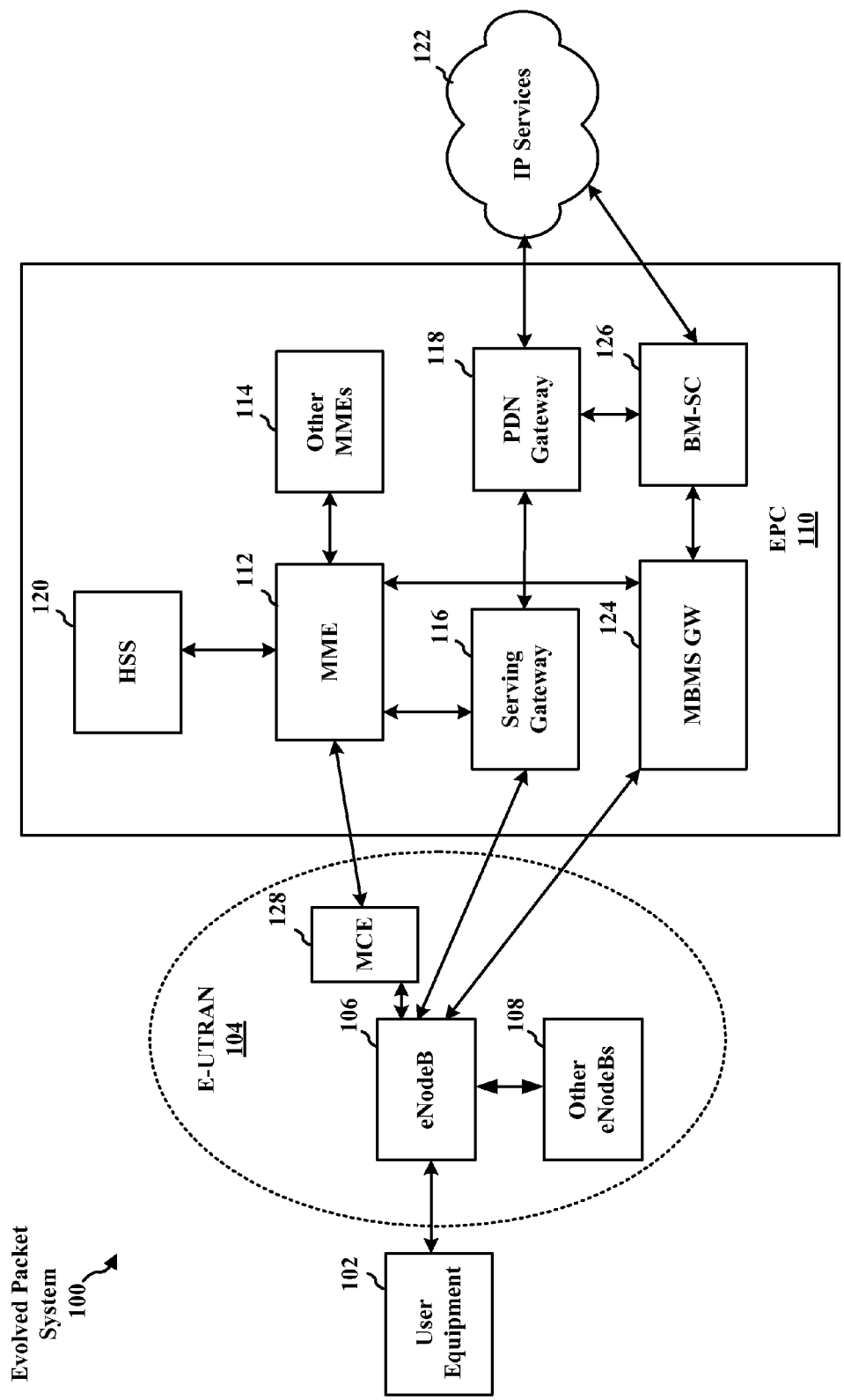
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
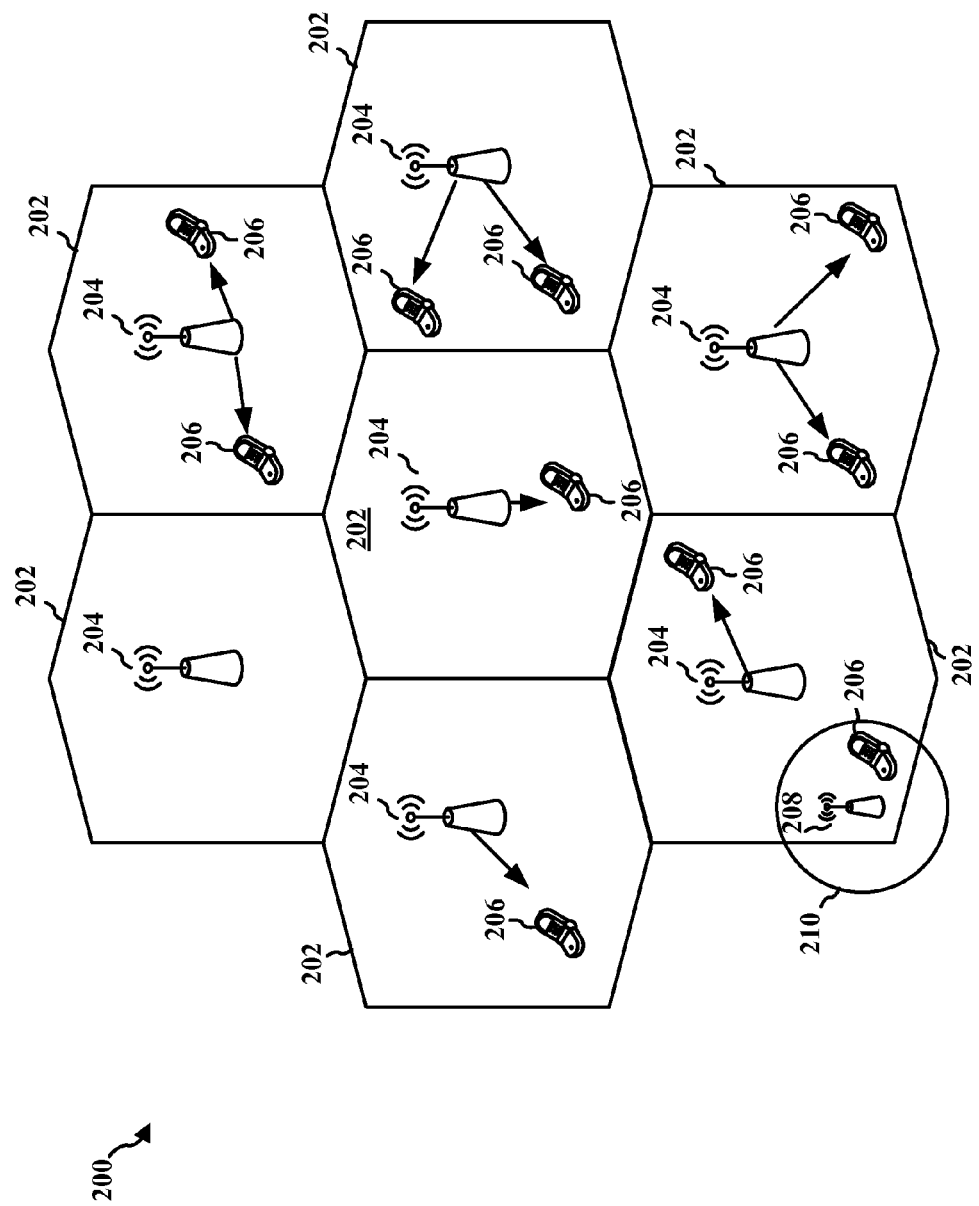
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
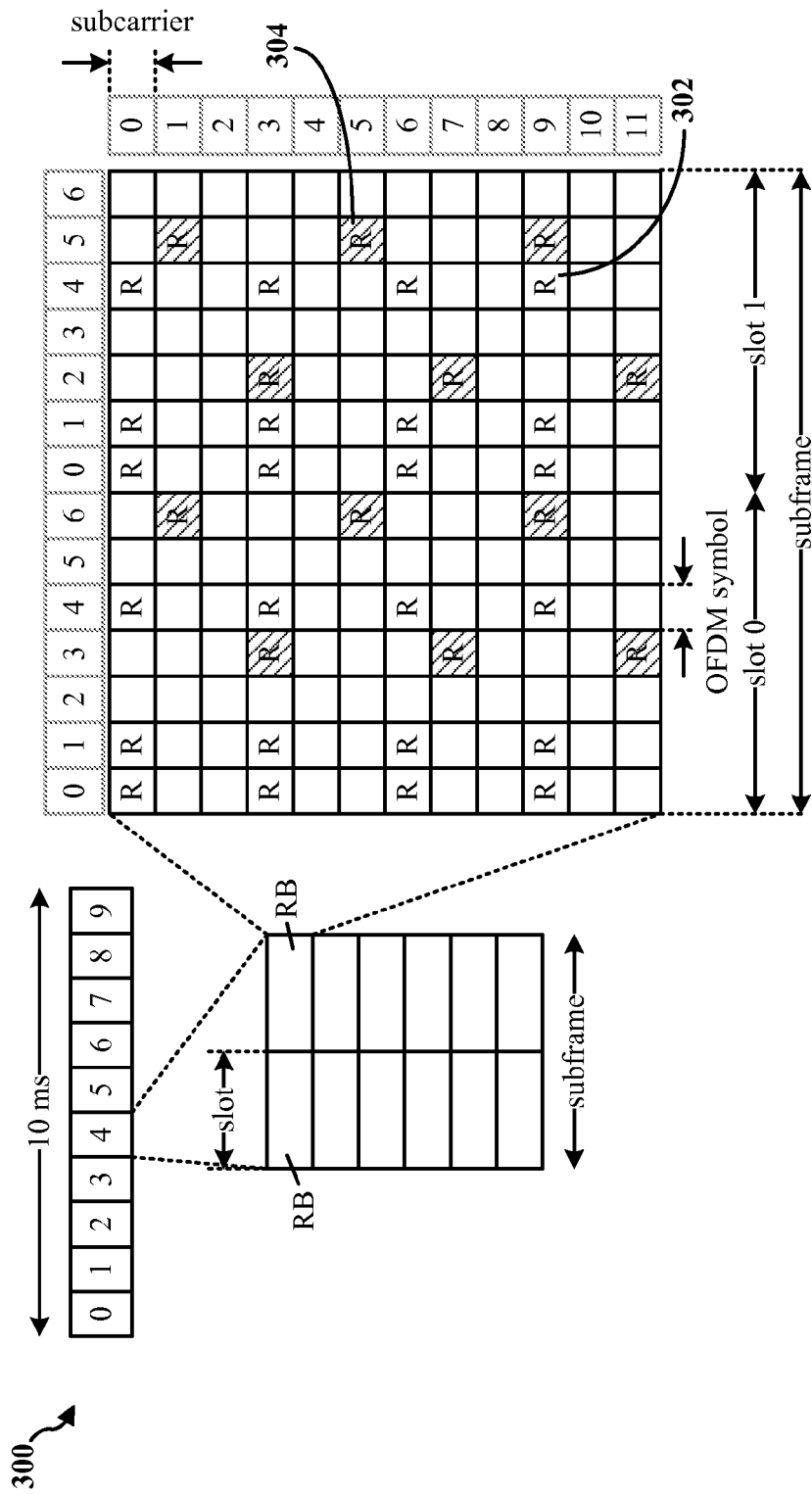
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 is transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
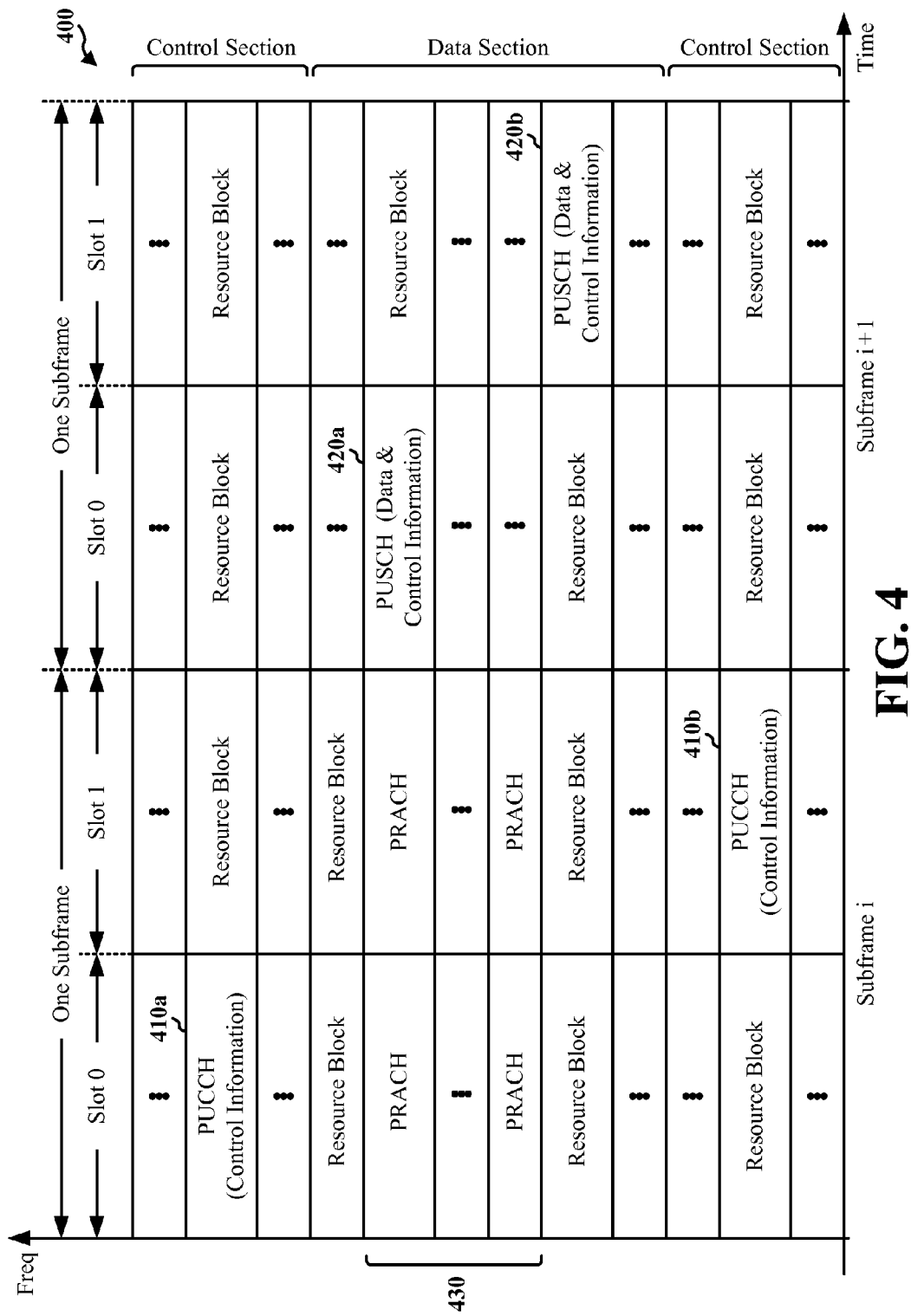
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
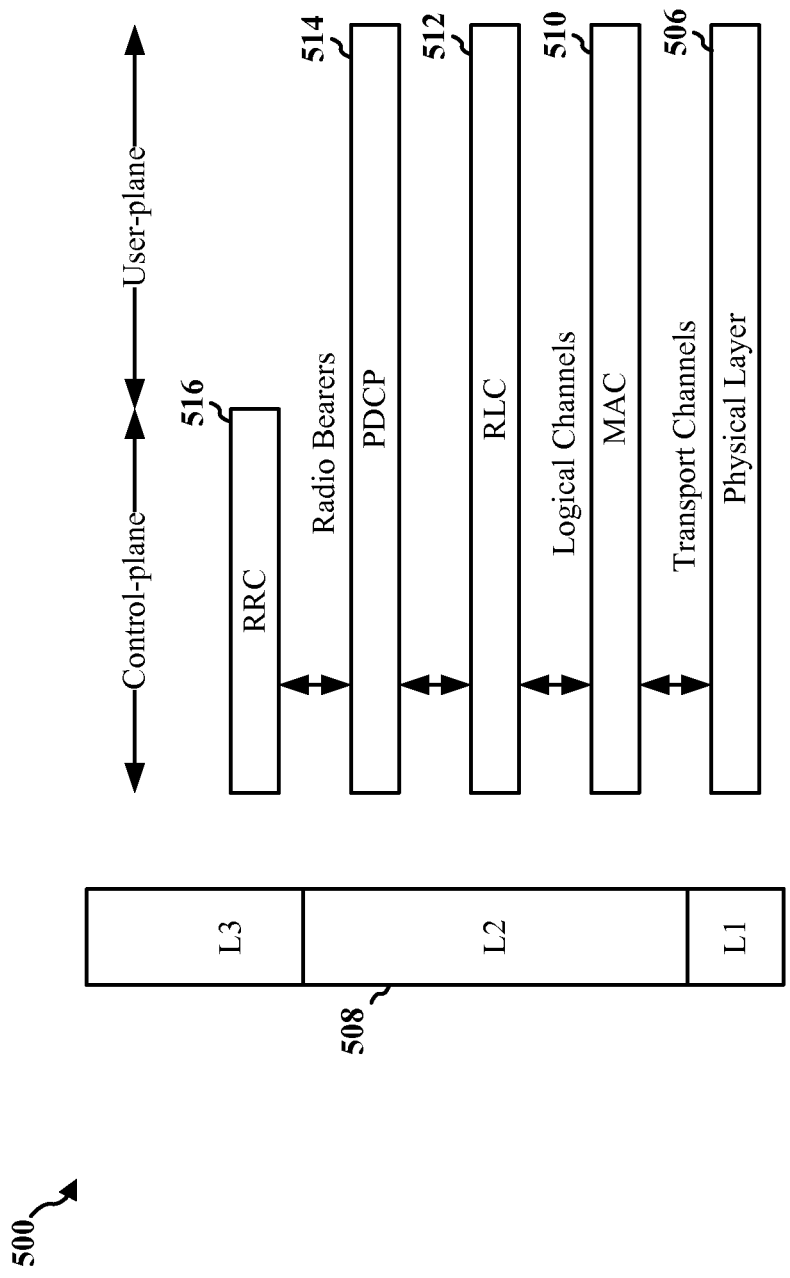
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer)

508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
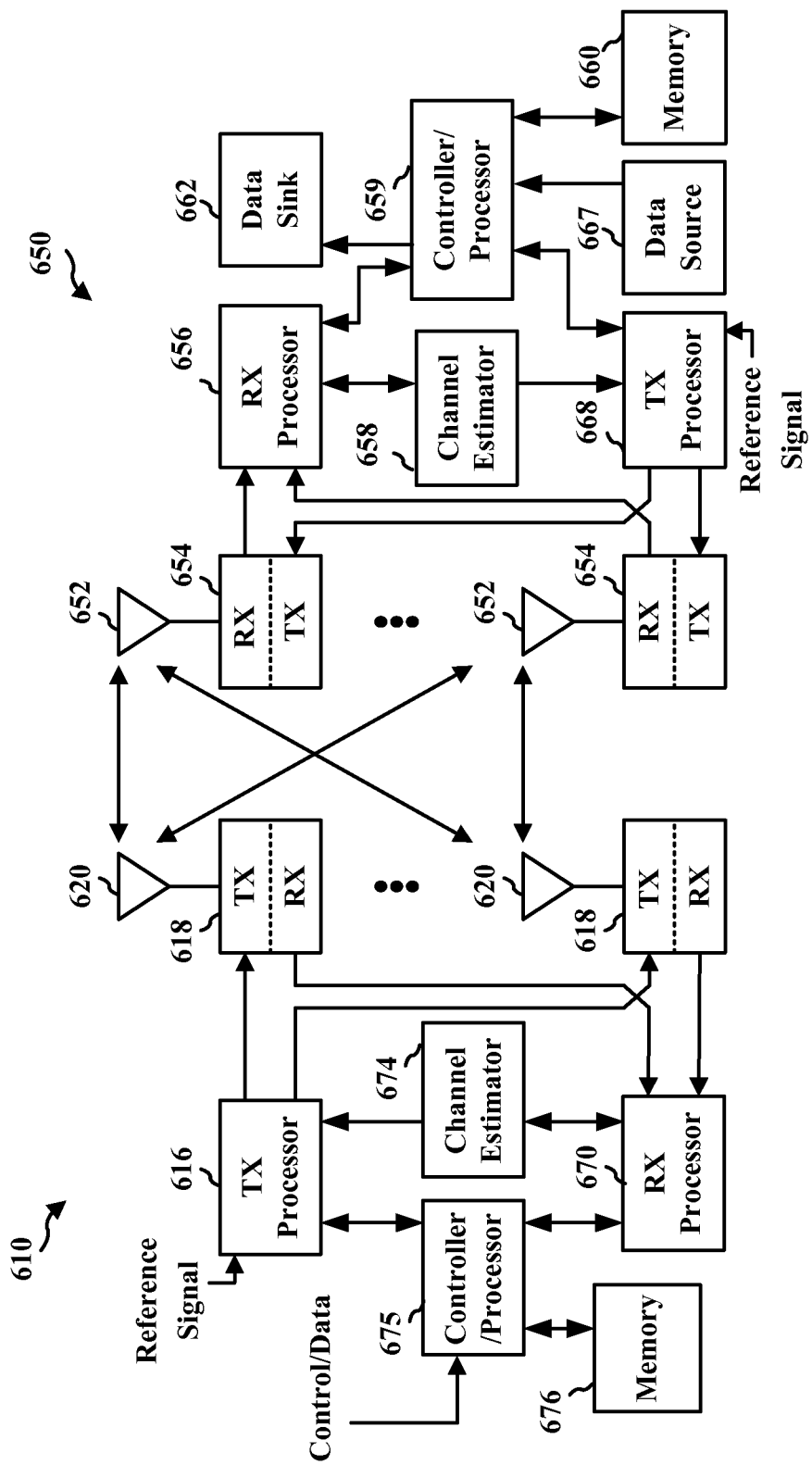
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
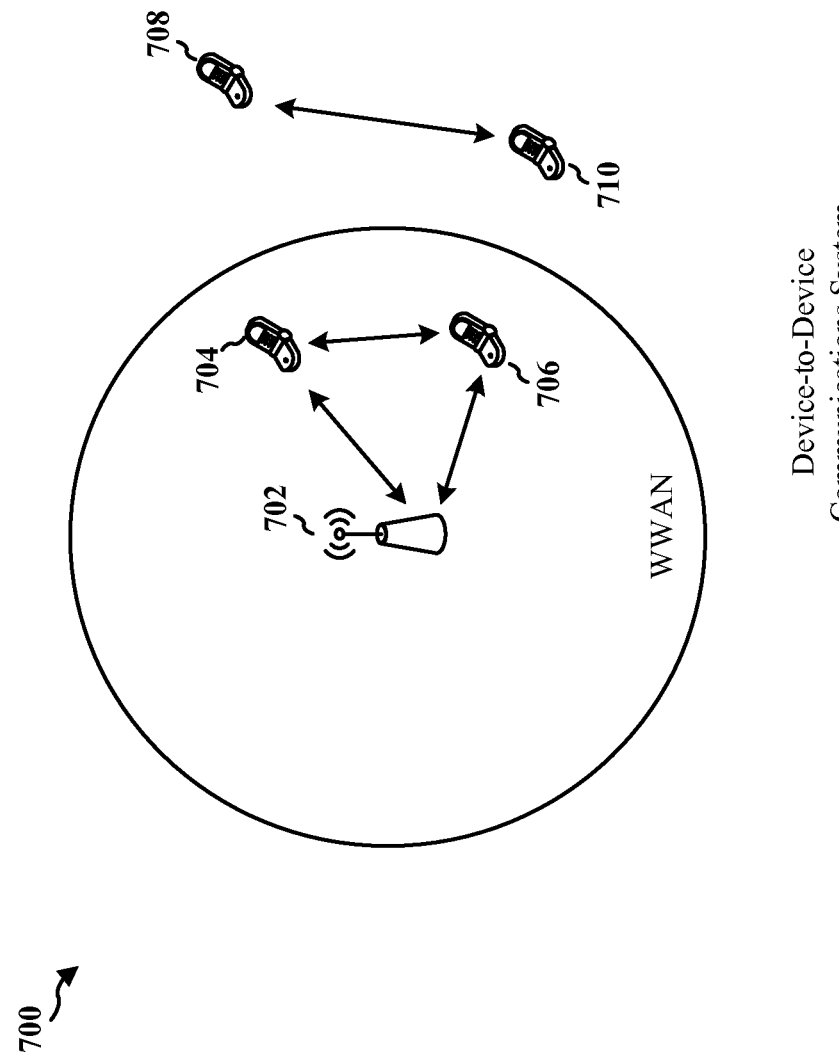
FIG. 7 is a diagram of a device-to-device communications system.

FIG. 7 is a diagram of a device-to-device (or peer-to-peer) communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on LTE, Neighbor Awareness Networking (NAN), FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In wireless device-to-device communications systems, it is important for a device to discover other devices within the vicinity of the device. A device may broadcast a peer discovery signal which conveys an "expression" used to identify the device. All of the various device-to-device communication systems mentioned above provide mechanisms for performing peer discovery, for example, by advertising and monitoring expressions to and from other devices.

The various aforementioned device-to-device communication systems provide support for performing peer discovery with varying capabilities. That is, various device-to-device communication systems may differ in range, expression size, discovery period, operating band, and power consumption, etc. For example, a typical LTE peer discovery deployment would have a relatively long range, small expression size, and slow discovery period (e.g., tens of seconds), which may not be ideal for some applications. By contrast, a Bluetooth peer discovery deployment may have a shorter range, larger expression size, and more frequent discovery period. Bluetooth's non-connectable undirected advertising events may have a minimum advertising interval of 100 ms. For WiFi/NAN, the discovery interval may be approximately 0.5 seconds. Because different device-to-device communication systems may be more appropriate under different circumstances, a device may incorporate several device-to-device communication systems and operate the systems concurrently. As such, the device would require multiple and different application programming interfaces (APIs) for each peer discovery service.

A need exists to present a single, unified discovery API to applications on devices running multiple device-to-device communication systems. A single, unified discovery API could provide a more flexible and dynamic high-level discovery service by optionally combining one or more expressions from the various underlying device-to-device communication systems as they become available. For example, an LTE peer discovery expression may be augmented with supplemental discovery information over WiFi (medium range) and/or Bluetooth (short range) as such information became available. Applications could use the supplemental medium/short range discovery information to convey more dynamic content within a high-level expression. The high-level expression may also be used as an embedded low rate data channel. In one example, a device could transmit a string/URL over the WiFi medium range channel by fragmenting the string/URL and transmitting the pieces over successive discovery frames. A single, unified discovery API may allow a monitoring device to build a more detailed view of an advertising device as both devices become closer in proximity to each other. Further, a single, unified discovery API for signaling the presence of any supplemental cross-technology discovery information may be useful for helping mobile devices conserve power. For example, control bits within the primary LTE peer discovery expression could be used for this purpose.

FIG. 8A is a diagram 800 for illustrating an exemplary structure for a high-level expression data for a single, unified discovery API used in peer-to-peer communications. In this example, the high-level expression data may contain a primary expression 802 and one or more supplemental information indicators 804, 806. The primary expression 802 may correspond to a first peer discovery service over a WWAN (e.g., LTE). The high-level expression data may contain a supplemental information indicator 804 that indicates supplemental information is available over a second peer discovery service (e.g., medium range discovery service) such as WLAN (e.g., WiFi/NAN). The high-level expression data may further contain a second supplemental information indicator 806 that indicates supplemental information is available over a third peer discovery service (e.g., short range discovery service) such as PAN (e.g., Bluetooth). The first, second, and third peer discovery services may differ in range and periodicity. In one configuration, an advertising device may transmit the high-level expression data containing a primary expression 802 with one or more supplemental information indicators 804, 806 that indicate supplemental information is available. For example, in a retail setting, a restaurant may advertise its presence using high-level expression data containing the primary expression 802. The high-level expression data may include supplemental information indicators 804, 806 that indicate supplemental information is available over a second and third peer discovery service. Also, the high-level expression data may include supplemental information 808, 810 corresponding to a welcome message, restaurant menu, and/or coupon information.

FIG. 8B is a diagram 850 for illustrating an exemplary data structure for use in peer-to-peer communication systems. To associate supplemental information 854 with the primary expression 802, a primary expression identifier 852 may be appended to the supplemental information 854 for transmission over medium and/or short range peer-to-peer communication systems. For example, an advertising device transmitting a primary expression 802 may apply a hash function to the primary expression 802 and obtain a hash value. The hash function may vary with time (e.g., every discovery period). The computed hash value may be used as a primary expression identifier 852 and included with or appended (e.g., prepended) to any medium and/or short range peer discovery information that is being transmitted. The primary expression identifier 852 serves as an identifier to allow a monitoring device to associate the supplemental information 854 with the primary expression 802.

Figure 9:
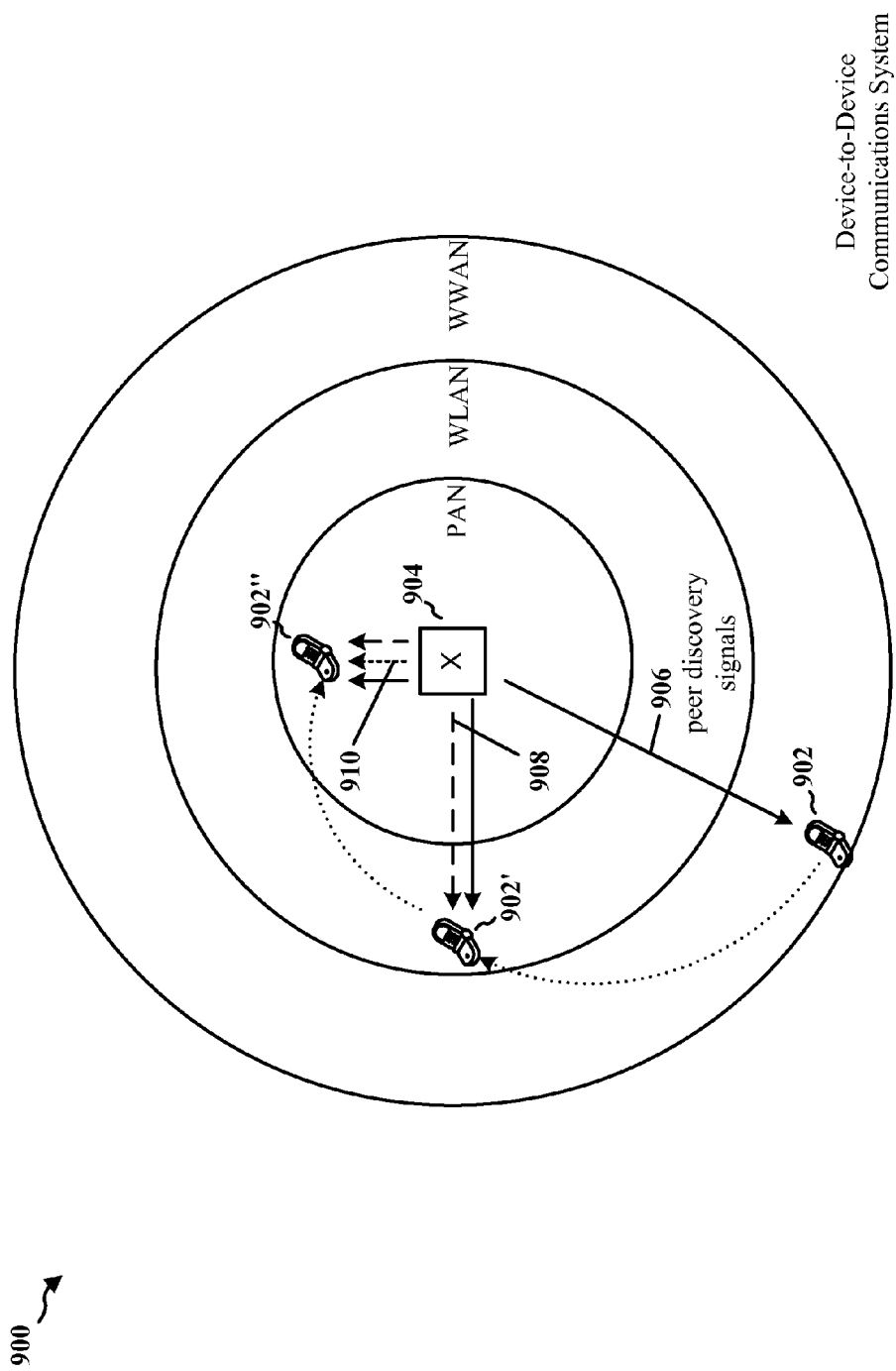
FIG. 9 is a diagram illustrating exemplary methods in relation to supplemental cross technology discovery.

FIG. 9 is a diagram illustrating exemplary methods in relation to supplemental cross technology discovery. The device X 904 may be a base station, an access point, a UE, or another wireless device. The device X 904 may transmit peer discovery signals 906, 908, and 910. The device X 904 may transmit a first peer discovery signal 906 containing a first set of information, which may include a primary expression and one or more supplemental information indicators. The supplemental information indicators may indicate that supplemental information is available on other peer discovery networks. The device X 904 may transmit the first peer discovery signal 906 with a first periodicity and a first peer discovery range. For example, the device X 904 may be in a restaurant and may transmit the first set of information in a first peer discovery signal 906 over a WWAN, such as LTE, to advertise the restaurant to nearby UEs.

The peer discovery signal 906 may contain supplemental information indicators indicating that the device X 904 is transmitting a second peer discovery signal 908 that contains a second set of information. The device X 904 may transmit the second set of information in the second peer discovery signal 908 with a second periodicity and a second peer discovery range. The second periodicity may be different from the first periodicity and/or the second peer discovery range may be different from the first peer discovery range. The second set of information may be associated with the first set of information. For example, the second set of information may provide details or additional information related to the first set of information. In one configuration, the second set of information may contain a first identifier based on the first set of information. In one aspect, the device X 904 can apply a hash function on the first set of information (e.g., on the primary expression) to generate a hash value, which serves as the first identifier. The hash function may vary over time (e.g., every discovery period). For example, in addition to transmitting the first set of information, the device X 904 may also transmit a second set of information over a WLAN, such as WiFi/NAN, in the second peer discovery signal 908 to provide a restaurant menu. The restaurant menu provided in the second set of information may be associated with the restaurant identified in the first set of information based on a first identifier. In this example, the WLAN may have a shorter peer discovery range and a greater periodicity than the WWAN.

The peer discovery signal 906 may contain supplemental information indicators indicating that the device X 904 is transmitting a third peer discovery signal 910 that contains a third set of information. The device X 904 may transmit the third set of information with a third periodicity and a third peer discovery range different from the first periodicity and first peer discovery range and/or the second periodicity and the second peer discovery range. The third set of information may be associated with the first or second set of information. For example, the third set of information may provide details or additional information related to the first or second set of information. In one configuration, the third set of information contains a second identifier based on the first or second set of information. In one aspect, the device X 904 may apply a hash function on the first or second set of information to generate the second identifier. For example, the device X 904 may transmit a third set of information over a PAN, such as Bluetooth, to provide restaurant coupons. In this example, the restaurant coupons may be associated with the restaurant identified in the first set of information based on a second identifier. In this example, the PAN may have a shorter peer discovery range and a greater periodicity than both the WWAN and the WLAN.

On the UE 902, a user application may request the UE 902 to monitor for one or more peer discovery signals. When the UE 902 comes within range of a first peer discovery signal 906 with a first periodicity and a first peer discovery range, the UE 902 may receive a first set of information. The first set of information in the peer discovery signals 906 may contain a primary expression from the device X 904. The peer discovery signals 906 from device X 904 may also contain one or more supplemental information indicators that indicate supplemental information is available on other peer discovery networks. If supplemental information is available, depending on the user preferences selected on the UE 902, the UE 902 may begin monitoring the other peer discovery networks for supplemental information. For example, a user application may request that the UE 902 monitor for peer discovery signals 906 from a restaurant. The device X 904 may be transmitting peer discovery signals 906, 908, and 910 from within the restaurant. The UE 902 may receive a first set of information in peer discovery signals 906 over a WWAN, such as LTE, advertising that the restaurant is nearby. Upon receiving the first set of information and determining that the first set of information matches the application's request, the UE 902 may send an expression_match indication to the application on the UE 902 that made the request. Further, upon receiving the first set of information from the restaurant, the UE 902 may learn, based on the supplemental information indicators in the first set of information, that supplemental information is available on a second peer discovery signal 908 and/or a third peer discovery signal 910. Depending on the user preferences selected on the UE 902, the UE 902 may begin monitoring the other peer discovery signals 908, 910 for supplemental information.

The UE 902 may move to a different location indicated by the UE 902'. The new location of the UE 902' may be in closer proximity to the device X 904. At the new location, the UE 902' is within range of both the first peer discovery signal 906 and the second peer discovery signal 908. If the UE 902' is monitoring for the second peer discovery signal 908, the UE 902' may receive a second set of information in the second peer discovery signal 908. The second peer discovery signal 908 may have a second periodicity and a second peer discovery range different from the first periodicity of the first peer discovery signal 906 and/or the first peer discovery range of the first peer discovery signal 906.

Upon receiving the second set of information, the UE 902' may determine whether the second set of information is associated with the first set of information. In one configuration, the second set of information may include a first identifier that associates the second set of information with the first set of information. The UE 902' may apply a hash function to the first set of information to generate a hash value. The hash function may vary over time (e.g., every discovery period). The UE 902' may compare the hash value to the first identifier. If the hash value and the first identifier are the same, then the second set of information is associated with the first set of information. For example, as the UE 902' moves closer to the restaurant (e.g., arrives in the parking lot), the UE 902' may be listening over a WLAN, such as WiFi/NAN, for peer discovery signals 908. The UE 902' may see, for example, a WiFi/NAN cluster on channel 6 and start listening during the WiFi/

NAN discovery window. The UE 902' may receive a WiFi/NAN discovery frame containing data and a first identifier that associates the WiFi/NAN discovery frame with the first set of information. The UE 902' may apply a hash function to the first set of information to generate a hash value and compare the hash value to the first identifier. If the hash value matches the first identifier, then the UE 902' will determine that the WiFi/NAN discovery frame is associated with the first set of information. The API may issue to the application an expression_match_update indication, which may contain a length, payload bytes, and peer discovery range identifier. The API may remove the first identifier and deliver the data to the application. The application may then examine and store the data. If the data is a fragment, the data is stored until all of the data has been received. The UE 902' may receive a second WiFi/NAN discovery frame associated with the first set of information. The second WiFi/NAN discovery frame has the same first identifier but different payload data. The application may examine the data and determine that the second WiFi/NAN discovery frame is the remainder of the data. At this point, the application may display and/or transmit the data. For example, the application may display a restaurant menu once all of the data for the restaurant menu has been received.

The UE 902' may move to yet another location indicated by the UE 902". The new location of the UE 902" may be in closer proximity to the device X 904. At the new location, the UE 902" is within range of the first, second, and third peer discovery signals 906, 908, and 910, respectively. If the UE 902" is monitoring for the third peer discovery signal 910, the UE 902" may receive a third set of information in the third peer discovery signal 910. The third peer discovery signal 910 may have a third periodicity and a third peer discovery range different from the first periodicity and first peer discovery range of the first peer discovery signal 906 and/or the second periodicity and the second peer discovery range of the second peer discovery signal 908.

Upon receiving the third set of information, the UE 902" may determine whether the third set of information is associated with either the first and/or second set of information. In one configuration, the third set of information may include a second identifier that associates the third set of information with the first and/or second set of information. The UE 902" may apply a hash function to the first or second set of information to generate a hash value. The UE 902" may compare the hash value to the second identifier. If the hash value and the second identifier are the same, then the third set of information is associated with the first and/or second set of information. For example, as the UE 902" moves into the restaurant, the UE 902" may be listening over a PAN, such as Bluetooth, for peer discovery signals 910. The UE 902", for example, may receive a Bluetooth protocol data unit (PDU) containing the second identifier that associates the third set of information with the first set of information. For example, if the third set of information is a coupon code, the UE 902" may apply a hash function on the restaurant data from the first set of information to generate a hash value and compare that hash value to the second identifier. Alternatively, the UE 902" may apply a hash function on the restaurant menu information from the second set of information to generate a hash value and compare that hash value to the second identifier. If either of those comparisons indicates that the second identifier matches the generated hash value, the UE 902" determines that the coupon is associated with the restaurant or the restaurant menu. Upon such a determination, the API may issue another expression_match_update indication to the application. The application may then examine the data and display the coupon code to the user.

FIG. 10 is a diagram 1000 that illustrates how the high-level expression data is presented to an application on a UE. For example, when the UE is within range of an LTE peer discovery expression of an advertising device, the UE may determine whether there is a primary expression match. There may be a primary expression match, for example, when the UE receives a desired primary expression for which the UE was instructed to monitor. Upon determining that there is a primary expression match, the UE may determine, based on any supplemental information indicators and user preferences, whether to monitor for supplemental information on other peer discovery networks. As the UE moves closer to the advertising device, supplemental information may become available. If the UE is instructed to monitor other peer discovery networks for the supplemental information, the UE may receive supplemental information within range. For example, if the UE comes within range of medium range information (e.g., WiFi Service-Specific Info 1), the UE will determine if the medium range information is associated with the primary expression. If the medium range information is associated with the primary expression, the medium range information will be delivered to the application. If a second medium range information (e.g., WiFi Service-Specific Info 2) is received, and the UE determines that the second medium range information matches the primary expression, the second medium range information is delivered to the application. If the UE moves closer again to the advertising device, supplemental information may become available. For example, if the UE comes within range of short range information (e.g., Bluetooth Advertisement Info 1), the UE may determine if the short range information is associated with the primary expression. If so, the short range information will be delivered to the application. If a second short range information is received (e.g., Bluetooth Advertisement Info 2), and the UE determines that the second short range information matches the primary expression, the second short range information is delivered to the application. If a final short range information is received (e.g., Bluetooth Advertisement Info 3), and the UE determines that the final short range information matches the primary expression, the final short range information is delivered to the application. In sum, FIG. 10 portrays how the high-level expression data presented to the application would get supplemented as the UE approaches and then lingers in the immediate vicinity of the advertising device.

Figure 11:
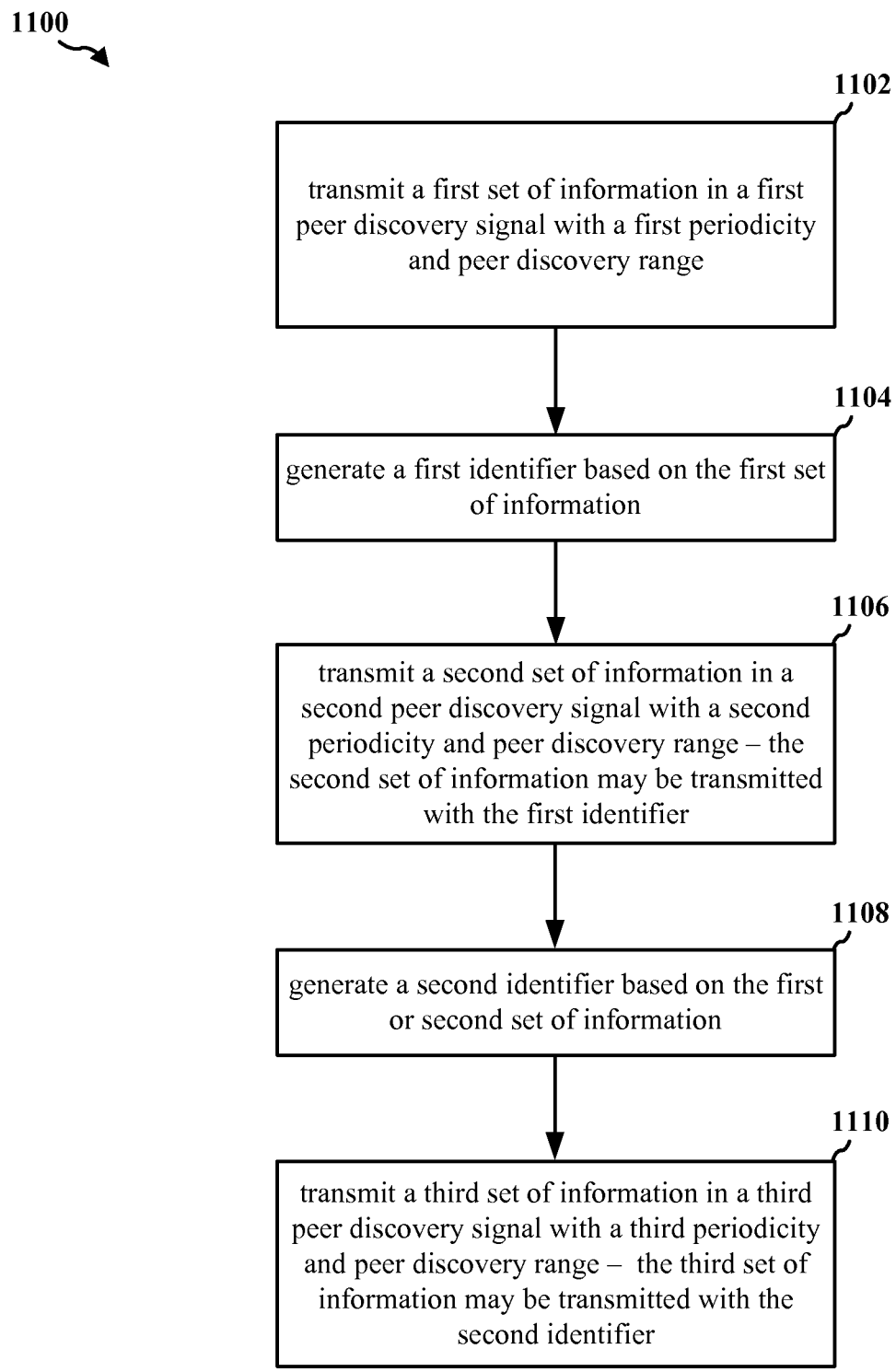
FIG. 11 is a flow chart of a first method of wireless communication.

FIG. 11 is a flow chart 1100 of a method of wireless communication. The method may be performed by an apparatus such as a base station, an access point, or a UE (e.g., the device X 904). At step 1102, the apparatus may transmit to a UE (e.g., the UE 902) a first set of information in a first peer discovery signal with a first periodicity and first peer discovery range. In one configuration, the apparatus may transmit a first set of information that may include a primary expression and one or more supplemental information indicators in a first peer discovery signal. The supplemental information indicators may indicate that supplemental information is available on other peer discovery networks. For example, the apparatus may transmit over a WWAN (e.g., LTE) a first set of information including a primary expression advertising a restaurant and supplemental information indicators that indicate additional information about the restaurant is available on other peer discovery networks like WLAN (e.g., WiFi) and PAN (e.g., Bluetooth).

At step 1104, the apparatus may generate a first identifier based on the first set of information. The first identifier may be generated from the primary expression of the first set of information. The apparatus may apply a hash function on the first set of information to generate a hash value. The hash function may also vary over time (e.g., every discovery period). The generated hash value could serve as the first identifier.

At step 1106, the apparatus may transmit a second set of information in a second peer discovery signal with a second periodicity and second peer discovery range. The second periodicity may be different from the first periodicity and/or the second peer discovery range may be different from the first peer discovery range. For example, the second periodicity may be greater than the first periodicity, and the second peer discovery range may be less than the first peer discovery range. The second set of information may be transmitted with the first identifier such that the UE may associate the second set of information with the first set of information. For example, the apparatus may transmit a second set of information over a WLAN containing information on a menu associated with the restaurant.

At step 1108, the apparatus may generate a second identifier based on the first or second set of information. The apparatus may apply a hash function on the first or second set of information to generate a hash value. The hash function may vary over time (e.g., every discovery period). The generated hash value could serve as the second identifier.

Finally, at step 1110, the apparatus may transmit to the UE a third set of information in a third peer discovery signal with a third periodicity and peer discovery range. The third periodicity and third peer discovery range may be different from the first periodicity and first peer discovery range and/or the second periodicity and second peer discovery range. For example, the third periodicity may be greater than the first and/or second periodicity, and the third peer discovery range may be less than the first and/or second peer discovery range. The third set of information may be transmitted with the second identifier such that the UE may associate the third set of information with the first or second set of information. For example, the apparatus may transmit a third set of information over a PAN such as a coupon for a food item associated with the restaurant or restaurant menu.

Figure 12:
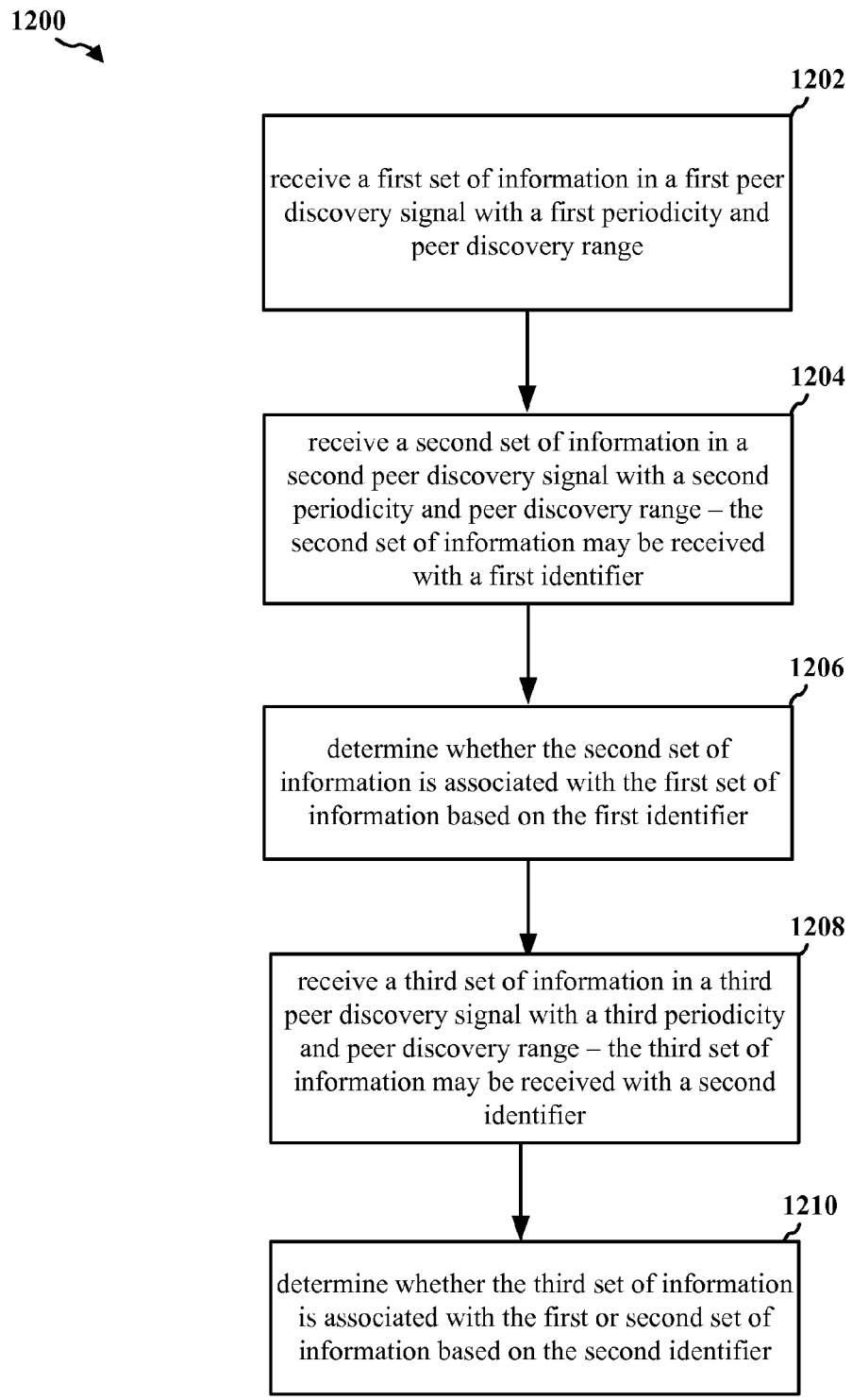
FIG. 12 is a flow chart of a second method of wireless communication.

FIG. 12 is a flow chart 1200 of a method of wireless communication. The method may be performed by a UE (e.g., the UE 902, the UE 902', and the UE 902"). At step 1202, the UE may receive from a base station (e.g., the device X 904) a first set of information in a first peer discovery signal with a first periodicity and first peer discovery range. For example, the UE may receive a first set of information that may include a primary expression and one or more supplemental information indicators in a first peer discovery signal. The supplemental information indicators may indicate supplemental information is available on other peer discovery networks. For example, the UE may receive over a WWAN (e.g., LTE) a first set of information including a primary expression advertising a restaurant in the vicinity of the UE and supplemental information indicators that indicate additional information about the restaurant is available on other peer discovery networks like WLAN (e.g., WiFi) and PAN (e.g., Bluetooth). Depending on the user preferences of the UE, the UE may begin to monitor the other peer discovery networks for supplemental information based on the supplemental information indicators.

At step 1204, the UE may receive from the base station a second set of information in a second peer discovery signal with a second periodicity and second peer discovery range. The second periodicity and second peer discovery range may be different from the first periodicity and first peer discovery range. For example, the second periodicity may be greater than the first periodicity, and the second peer discovery range may be less than the first peer discovery range. The UE may receive the second set of information with a first identifier such that the UE may associate the second set of information with the first set of information.

At step 1206, the UE may determine whether the second set of information is associated with the first set of information based on the received first identifier. For example, the UE may apply a hash function, which may be time-variable, to the received first set of information and compare the hash value to the first identifier. If the hash value matches the first identifier, then the UE may determine that the second set of information is associated with the first set of information and store the second set of information. However, if the hash value does not match the first identifier, the UE may determine that the first and second sets of information are not associated with each other and discard the second set of information. For example, the UE may receive a second set of information over a WLAN and determine that the second set of information contains data for a restaurant menu associated with the restaurant discovered from the first set of information.

At step 1208, the UE may receive from the base station a third set of information in a third peer discovery signal with a third periodicity and third peer discovery range. The third periodicity and third peer discovery range may be different from the first periodicity and first peer discovery range and/or the second periodicity and second peer discovery range. For example, the third periodicity may be greater than the first and/or second periodicity, and the third peer discovery range may be less than the first and/or second peer discovery range. The third set of information may be transmitted with the second identifier such that the UE may associate the third set of information with the first or second set of information.

Finally, at step 1210, the UE may determine whether the third set of information is associated with the first or second set of information based on the received second identifier. For example, the UE may apply a hash function, which may be time-variable, to the received first or second set of information and compare the hash value to the second identifier. If the hash value matches the second identifier, then the UE may determine that the third set of information is associated with the first or second set of information and store the third set of information. However, if the hash value does not match the second identifier, the UE may determine that the third set of information is not associated with the first or second set of information and discard the third set of information. For example, the UE may receive a third set of information over a PAN and determine that the third set of information contains data for a coupon for a menu item associated with the restaurant discovered from the first set of information.

Figure 13:
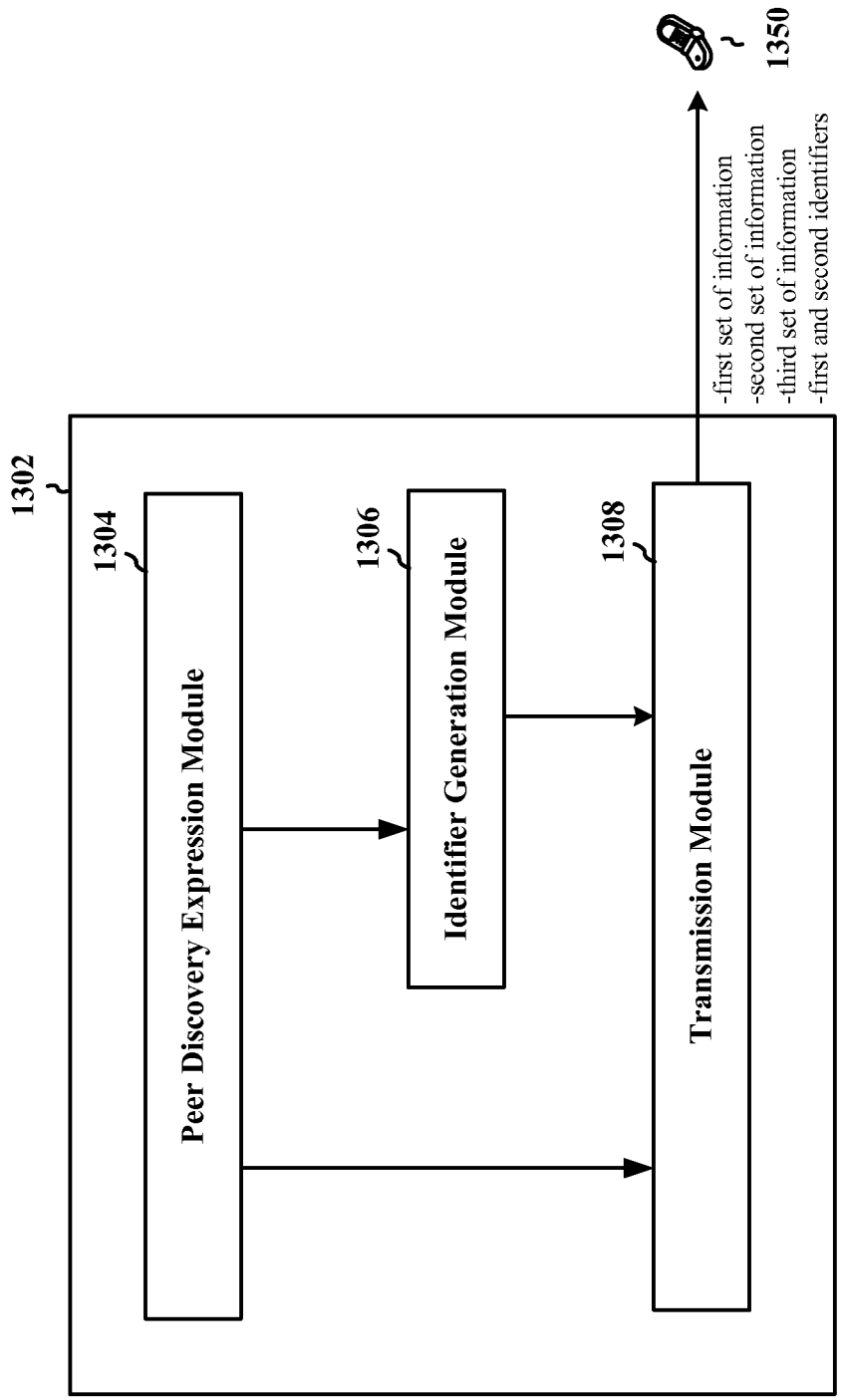
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a base station, access point, UE, or another wireless device. The apparatus includes a peer discovery expression module 1304 that may be configured to generate peer discovery expressions for transmission over various peer discovery signals. The peer discovery expression module 1304 may be configured to send a peer discovery expression to both the identifier generation module 1306 and the transmission module 1308. The transmission module 1308 may be configured to transmit a first set of information (e.g., peer discovery expressions) in a first peer discovery signal with a first periodicity and a first peer discovery range. The transmission module 1308 may be further configured to transmit a second set of information in a second peer discovery signal with a second periodicity and a second peer discovery range. The second periodicity may be different from the first periodicity, the second peer discovery range may be less than the first peer discovery range, and the second set of information may be associated with the first set of information. The first set of information may include information indicating that the second set of information will be transmitted with the second periodicity and the second peer discovery range. The identifier generation module 1306 may be configured to generate an identifier based on the first set of information, in which the identifier is transmitted with the second set of information. The identifier may be a hash value generated based on a hash function applied to the first set of information, and the hash function may vary over time. The transmission module 1308 may be configured to transmit the first set of information through a WWAN and the second set of information through one of a WLAN or PAN. The transmission module 1308 may be configured to transmit a third set of information in a third peer discovery signal with a third periodicity and a third peer discovery range. The third periodicity may be different from the second periodicity, the third peer discovery range may be less than the second peer discovery range, and the third set of information may be associated with the first set of information. The first set of information may include information indicating that the second set of information will be transmitted with the second periodicity and the second peer discovery range and the third set of information will be transmitted with the third periodicity and the third peer discovery range. The identifier generation module 1306 may be configured to generate a first identifier based on the first set of information. The first identifier may be transmitted with the second set of information. The identifier generation module 1306 may be further configured to generate a second identifier based on one of the first set of information or the second set of information. The second identifier may be transmitted with the third set of information. The first identifier may be a hash value generated based on a first hash function applied to the first set of information, and the second identifier may be a hash value generated based on a second hash function applied to said one of the first set of information or the second set of information. The first set of information may be transmitted through a WWAN, the second set of information may be transmitted through a WLAN, and the third set of information may be transmitted through a PAN.

The apparatus may include additional modules that perform each of the steps of the algorithm in the aforementioned flow charts of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
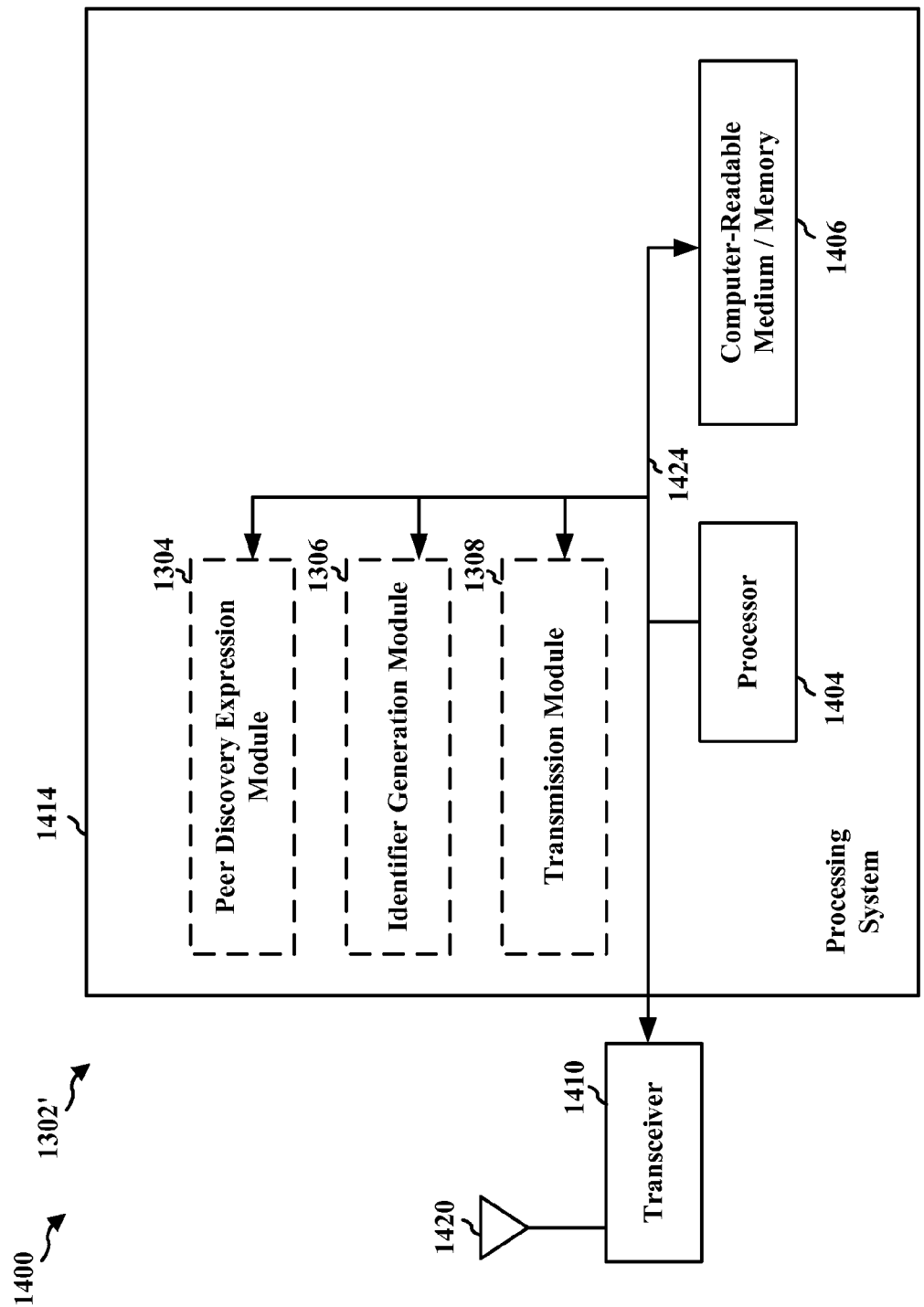
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414. In addition, the transceiver 1410 receives information from the processing system 1414, specifically the transmission module 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, and 1308. The modules may be software modules running in the processor 1404, resident/stored in the computer readable medium/memory 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1302/1302' for wireless communication includes means for generating peer discovery expressions for transmission over various peer discovery signals. The apparatus may include means for transmitting a first set of information (e.g., peer discovery expressions) in a first peer discovery signal with a first periodicity and a first peer discovery range. The apparatus may further include a means for transmitting a second set of information in a second peer discovery signal with a second periodicity and a second peer discovery range. The second periodicity may be different from the first periodicity, the second peer discovery range may be less than the first peer discovery range, and the second set of information may be associated with the first set of information. In one configuration, the first set of information may include information indicating that the second set of information will be transmitted with the second periodicity and the second peer discovery range. The apparatus may include means for generating an identifier based on the first set of information, in which the identifier is transmitted with the second set of information. In one configuration, the means for generating an identifier may be configured to apply a hash function to the first set of information to generate a hash value. In such a configuration, the hash function may vary over time. In one configuration, the means for transmitting may be configured to transmit the first set of information through a WWAN and the second set of information through one of a WLAN or PAN. The apparatus may further include a means for transmitting a third set of information in a third peer discovery signal with a third periodicity and a third peer discovery range. The third periodicity may be different from the second periodicity, the third peer discovery range may be less than the second peer discovery range, and the third set of information may be associated with the first set of information. In one configuration, the first set of information may include information indicating that the second set of information will be transmitted with the second periodicity and the second peer discovery range and the third set of information will be transmitted with the third periodicity and the third peer discovery range. The apparatus may include a means for generating a first identifier based on the first set of information, and a means for generating a second identifier based on one of the first set of information or the second set of information, the second identifier being transmitted with the third set of information. In one configuration, the first identifier may be a hash value generated based on a first hash function applied to the first set of information, and the second identifier may be a hash value generated based on a second hash function applied to said one of the first set of information or the second set of information. In one configuration, the first set of information may be transmitted through a WWAN, the second set of information may be transmitted through a WLAN, and the third set of information may be transmitted through a PAN. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 15:
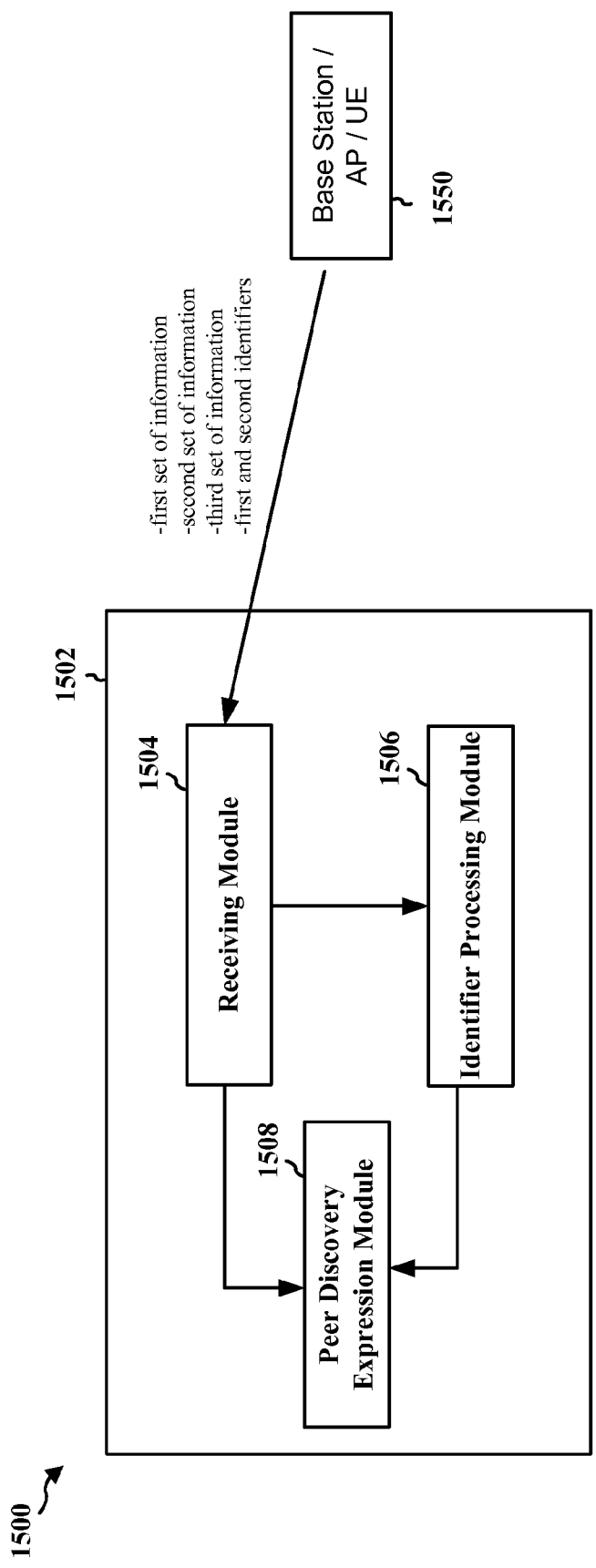
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE. The apparatus includes a receiving module 1504 that may be configured to receive a first set of information in a first peer discovery signal with a first periodicity and a first peer discovery range. The receiving module 1504 may be further configured to receive a second set of information in a second peer discovery signal with a second periodicity and a second peer discovery range. The second periodicity may be different from the first periodicity, and the second peer discovery range may be less than the first peer discovery range. The apparatus may include an identifier processing module 1506 that may be configured to determine that the second set of information is associated with the first set of information. The first set of information may include information indicating that the second set of information will be transmitted with the second periodicity and the second peer discovery range, and the second set of information may be received by the receiving module 1504 based on the information indicating that the second set of information will be transmitted with the second periodicity and the second peer discovery range. The receiving module 1504 may be further configured to receive an identifier with the second set of information. The identifier processing module 1506 may be configured to determine that the second set of information is associated with the first set of information based on the received identifier. The identifier processing module 1506 may be further configured to apply a hash function to the first set of information to generate a hash value, to compare the hash value to the identifier, and to determine that the second set of information is associated with the first set of information when the hash value and the identifier are the same. The hash function may vary over time. The first set of information may be received through a WWAN and the second set of information may be received through one of a WLAN or a PAN. The receiving module 1504 may be configured to receive a third set of information in a third peer discovery signal with a third periodicity and a third peer discovery range. The third periodicity may be different from the second periodicity, and the third peer discovery range may be less than the second peer discovery range. The identifier processing module 1506 may be configured to determine that the third set of information is associated with at least one of the first set of information or the second set of information. The first set of information may include information indicating that the second set of information will be transmitted with the second periodicity and the second peer discovery range and the third set of information will be transmitted with the third periodicity and the third peer discovery range. The second set of information may be received by the receiving module 1504 based on the information indicating that the second set of information will be transmitted with the second periodicity and the second peer discovery range. The third set of information may be received by the receiving module 1504 based on the information indicating that the third set of information will be transmitted with the third periodicity and the third peer discovery range. The receiving module 1504 may be further configured to receive a first identifier with the second set of information, and the identifier processing module 1506 may be configured to determine that the second set of information is associated with the first set of information based on the received first identifier. The receiving module 1504 may also be configured to receive a second identifier with the third set of information, and the identifier processing module 1506 may be configured to determine that the third set of information is associated with at least one of the first set of information or the second set of information based on the received second identifier. The identifier processing module 1506 may be further configured to apply a first hash function to the first set of information to generate a first hash value, to compare the first hash value to the first identifier, and to determine that the second set of information is associated with the first set of information when the first hash value and the first identifier are the same. The identifier processing module 1506 may be further configured to apply a second hash function to said at least one of the first set of information or the second set of information to generate a second hash value, to compare the second hash value to the second identifier, and to determine that the third set of information is associated with said at least one of the first set of information or the second set of information when the second hash value and the second identifier are the same. The first set of information may be received through a WWAN, the second set of information may be received through a WLAN, and the third set of information may be received through a PAN. The receiving module 1504 may be further configured to send the first, second, and/or third set of information to the peer discovery expression module 1508. The identifier processing module 1506 may be further configured to send a signal to the peer discovery expression module 1508 based on whether the first set of information is associated with the second and/or third set of information. If the second and/or third set of information is not associated with the first set of information, the peer discovery expression module 1508 may be configured to discard the second and/or third set of information.

The apparatus may include additional modules that perform each of the steps of the algorithm in the aforementioned flow charts of FIG. 12. As such, each step in the aforementioned flow charts of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
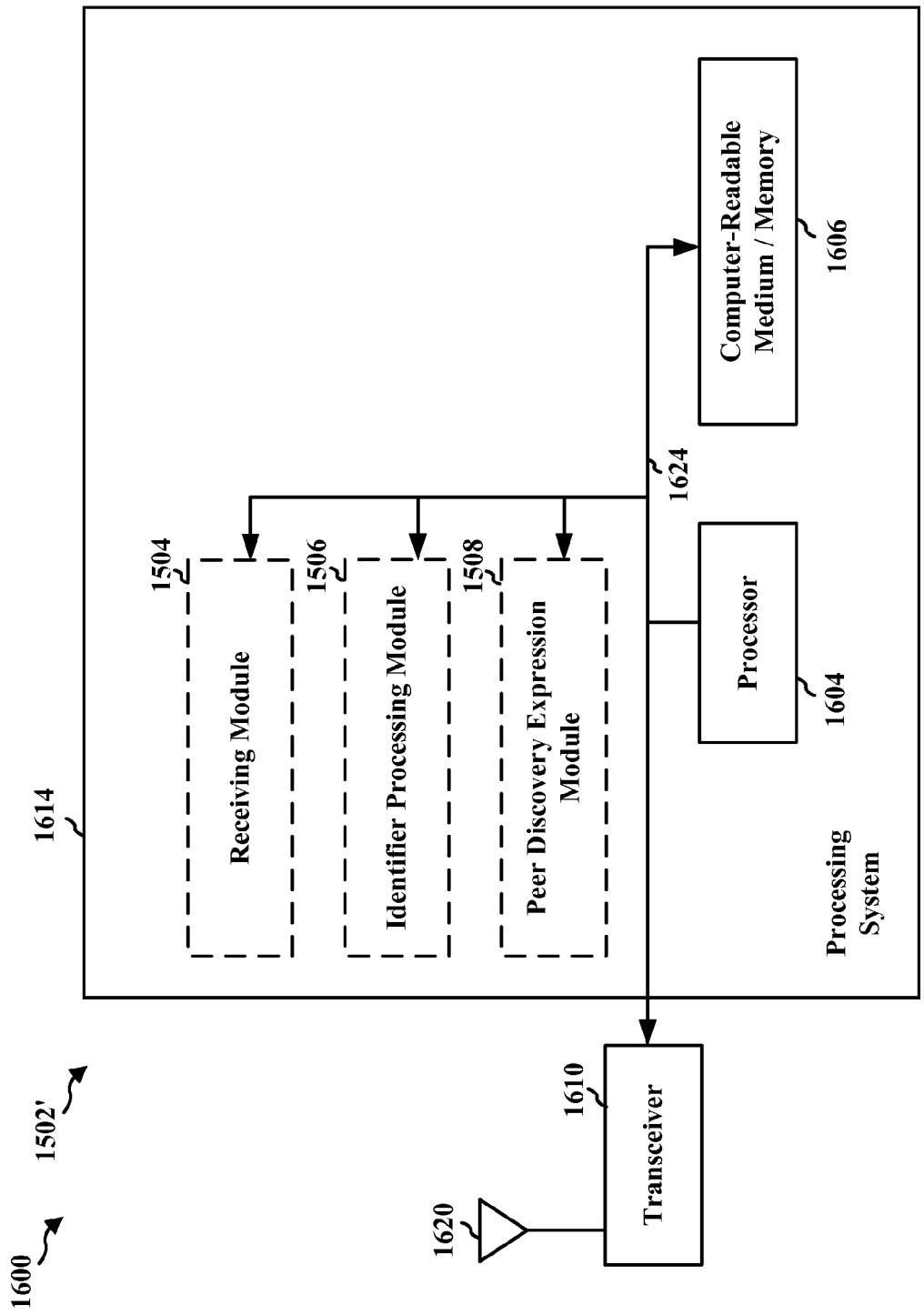
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1504. In addition, the transceiver 1610 receives information from the processing system 1614, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1506, and 1508. The modules may be software modules running in the processor 1604, resident/stored in the computer readable medium/memory 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for receiving a first set of information in a first peer discovery signal with a first periodicity and a first peer discovery range. The apparatus may further include means for receiving a second set of information in a second peer discovery signal with a second periodicity and a second peer discovery range. The second periodicity may be different from the first periodicity, and the second peer discovery range may be less than the first peer discovery range. The apparatus may include means for determining that the second set of information is associated with the first set of information. The first set of information may include information indicating that the second set of information will be transmitted with the second periodicity and the second peer discovery range, and the second set of information may be received based on the information indicating that the second set of information will be transmitted with the second periodicity and the second peer discovery range. The apparatus may include means for receiving an identifier with the second set of information. The apparatus may include means for determining that the second set of information is associated with the first set of information based on the received identifier. The apparatus may include means for applying a hash function to the first set of information to generate a hash value, means for comparing the hash value to the identifier, and means for determining configured to determine that the second set of information is associated with the first set of information when the hash value and the identifier are the same. The hash function may vary over time. The first set of information may be received through a wireless WWAN and the second set of information may be received through one of a WLAN or a PAN. The apparatus may further include means for receiving a third set of information in a third peer discovery signal with a third periodicity and a third peer discovery range. The third periodicity may be different from the second periodicity, and the third peer discovery range may be less than the second peer discovery range. The apparatus may include a means for determining that the third set of information is associated with at least one of the first set of information or the second set of information. The first set of information may include information indicating that the second set of information will be transmitted with the second periodicity and the second peer discovery range, and the third set of information will be transmitted with the third periodicity and the third peer discovery range. The second set of information may be received based on the information indicating that the second set of information will be transmitted with the second periodicity and the second peer discovery range. The third set of information may be received based on the information indicating that the third set of information will be transmitted with the third periodicity and the third peer discovery range. The apparatus may include means for receiving a first identifier with the second set of information. In this configuration, the apparatus may include a means for determining that the second set of information is associated with the first set of information based on the received first identifier. The apparatus may include means for receiving a second identifier with the third set of information. In this configuration the apparatus may include means for determining that the third set of information is associated with at least one of the first set of information or the second set of information based on the received second identifier. The apparatus may include means for applying a first hash function to the first set of information to generate a first hash value, means for comparing the first hash value to the first identifier, and means for determining configured to determine that the second set of information is associated with the first set of information when the first hash value and the first identifier are the same. The apparatus may further include means for applying a second hash function to said at least one of the first set of information or the second set of information to generate a second hash value, means for comparing the second hash value to the second identifier, and means for determining configured to determine that the third set of information is associated with said at least one of the first set of information or the second set of information when the second hash value and the second identifier are the same. The first set of information may be received through a WWAN, the second set of information may be received through a WLAN, and the third set of information may be received through a PAN. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   transmitting a first set of information in a first peer discovery signal with a first periodicity and a first peer discovery range, the first set of information including information for a second set of information; and
   transmitting the second set of information in a second peer discovery signal with a second periodicity and a second peer discovery range, the second periodicity being different from the first periodicity, the second peer discovery range being less than the first peer discovery range, the second set of information being associated with the first set of information.

2. The method of claim 1, wherein the first set of information includes information indicating that the second set of information will be transmitted with the second periodicity and the second peer discovery range.

3. The method of claim 1, further comprising generating an identifier based on the first set of information, wherein the identifier is transmitted with the second set of information.

4. The method of claim 3, wherein the identifier is a hash value generated based on a hash function applied to the first set of information.

5. The method of claim 4, wherein the hash function varies over time.

6. The method of claim 1, wherein the first set of information is transmitted through a wireless wide area network (WWAN) and the second set of information is transmitted through one of a wireless local area network (WLAN) or a personal area network (PAN).

7. The method of claim 1, further comprising transmitting a third set of information in a third peer discovery signal with a third periodicity and a third peer discovery range, the third periodicity being different from the second periodicity, the third peer discovery range being less than the second peer discovery range, the third set of information being associated with the first set of information.

8. The method of claim 7, wherein the first set of information includes information indicating that the second set of information will be transmitted with the second periodicity and the second peer discovery range and the third set of information will be transmitted with the third periodicity and the third peer discovery range.

9. The method of claim 7, further comprising:
   generating a first identifier based on the first set of information, the first identifier being transmitted with the second set of information; and
   generating a second identifier based on one of the first set of information or the second set of information, the second identifier being transmitted with the third set of information.

10. The method of claim 9, wherein the first identifier is a hash value generated based on a first hash function applied to the first set of information, and the second identifier is a hash value generated based on a second hash function applied to said one of the first set of information or the second set of information.

11. The method of claim 7, wherein the first set of information is transmitted through a wireless wide area network (WWAN), the second set of information is transmitted through a wireless local area network (WLAN), and the third set of information is transmitted through a personal area network (PAN).

12. A method of wireless communication of a user equipment (UE), comprising:
    receiving a first set of information in a first peer discovery signal with a first periodicity and a first peer discovery range, the first set of information including information for a second set of information;
    receiving the second set of information in a second peer discovery signal with a second periodicity and a second peer discovery range, the second periodicity being different from the first periodicity, the second peer discovery range being less than the first peer discovery range; and
    determining that the second set of information is associated with the first set of information.

13. The method of claim 12, wherein the first set of information includes information indicating that the second set of information will be transmitted with the second periodicity and the second peer discovery range, and the second set of information is received based on the information indicating that the second set of information will be transmitted with the second periodicity and the second peer discovery range.

14. The method of claim 12, further comprising receiving an identifier with the second set of information, wherein the UE determines that the second set of information is associated with the first set of information based on the received identifier.

15. The method of claim 14, further comprising:
    applying a hash function to the first set of information to generate a hash value; and
    comparing the hash value to the identifier, wherein the UE determines that the second set of information is associated with the first set of information when the hash value and the identifier are the same.

16. The method of claim 15, wherein the hash function varies over time.

17. The method of claim 12, wherein the first set of information is received through a wireless wide area network (WWAN) and the second set of information is received through one of a wireless local area network (WLAN) or a personal area network (PAN).

18. The method of claim 12, further comprising:
receiving a third set of information in a third peer discovery signal with a third periodicity and a third peer discovery range, the third periodicity being different from the second periodicity, the third peer discovery range being less than the second peer discovery range; and
determining that the third set of information is associated with at least one of the first set of information or the second set of information.

19. The method of claim 18, wherein the first set of information includes information indicating that the second set of information will be transmitted with the second periodicity and the second peer discovery range and the third set of information will be transmitted with the third periodicity and the third peer discovery range, the second set of information is received based on the information indicating that the second set of information will be transmitted with the second periodicity and the second peer discovery range, and the third set of information is received based on the information indicating that the third set of information will be transmitted with the third periodicity and the third peer discovery range.

20. The method of claim 18, further comprising:
receiving a first identifier with the second set of information, wherein the UE determines that the second set of information is associated with the first set of information based on the received first identifier; and
receiving a second identifier with the third set of information, wherein the UE determines that the third set of information is associated with at least one of the first set of information or the second set of information based on the received second identifier.

21. The method of claim 20, further comprising:
applying a first hash function to the first set of information to generate a first hash value;
comparing the first hash value to the first identifier, wherein the UE determines that the second set of information is associated with the first set of information when the first hash value and the first identifier are the same;
applying a second hash function to said at least one of the first set of information or the second set of information to generate a second hash value; and
comparing the second hash value to the second identifier, wherein the UE determines that the third set of information is associated with said at least one of the first set of information or the second set of information when the second hash value and the second identifier are the same.

22. The method of claim 18, wherein the first set of information is received through a wireless wide area network (WWAN), the second set of information is received through a wireless local area network (WLAN), and the third set of information is received through a personal area network (PAN).

23. An apparatus for wireless communication, comprising:
means for transmitting a first set of information in a first peer discovery signal with a first periodicity and a first peer discovery range, the first set of information including information for the second set of information; and
means for transmitting the second set of information in a second peer discovery signal with a second periodicity and a second peer discovery range, the second periodicity being different from the first periodicity, the second peer discovery range being less than the first peer discovery range, the second set of information being associated with the first set of information.

24. The apparatus of claim 23, further comprising means for generating an identifier based on the first set of information, wherein the identifier is transmitted with the second set of information.

25. The apparatus method of claim 23, further comprising means for transmitting a third set of information in a third peer discovery signal with a third periodicity and a third peer discovery range, the third periodicity being different from the second periodicity, the third peer discovery range being less than the second peer discovery range, the third set of information being associated with the first set of information.

26. The apparatus of claim 25, further comprising:
means for generating a first identifier based on the first set of information, the first identifier being transmitted with the second set of information; and
means for generating a second identifier based on one of the first set of information or the second set of information, the second identifier being transmitted with the third set of information.

27. An apparatus for wireless communication, the apparatus being a user equipment (UE), comprising:
means for receiving a first set of information in a first peer discovery signal with a first periodicity and a first peer discovery range, the first set of information including information for a second set of information;
means for receiving the second set of information in a second peer discovery signal with a second periodicity and a second peer discovery range, the second periodicity being different from the first periodicity, the second peer discovery range being less than the first peer discovery range; and
means for determining that the second set of information is associated with the first set of information.

28. The apparatus of claim 27, further comprising means for receiving an identifier with the second set of information, wherein the means for determining is configured to determine that the second set of information is associated with the first set of information based on the received identifier.

29. The apparatus of claim 28, further comprising:
means for applying a hash function to the first set of information to generate a hash value; and
means for comparing the hash value to the identifier,
wherein the means for determining determines that the second set of information is associated with the first set of information when the hash value and the identifier are the same.

30. The apparatus of claim 27, further comprising:
means for receiving a third set of information in a third peer discovery signal with a third periodicity and a third peer discovery range, the third periodicity being different from the second periodicity, the third peer discovery range being less than the second peer discovery range; and
means for determining that the third set of information is associated with at least one of the first set of information or the second set of information.

* * * * *